(12) United States Patent
Lai et al.

(10) Patent No.: US 12,031,707 B2
(45) Date of Patent: Jul. 9, 2024

(54) NIGHT DOWNLIGHT

(71) Applicant: Xiamen Topstar Lighting Co., Ltd., Xiamen (CN)

(72) Inventors: Jiajie Lai, Xiamen (CN); Yongjie Wu, Xiamen (CN); Xibin Lin, Xiamen (CN)

(73) Assignee: Xiamen Topstar Lighting Co., Ltd., Xiamen (CN)

( * ) Notice: Subject to any disclaimer, the term of this patent is extended or adjusted under 35 U.S.C. 154(b) by 0 days.

(21) Appl. No.: 18/342,507

(22) Filed: Jun. 27, 2023

(65) Prior Publication Data

US 2023/0341105 A1 Oct. 26, 2023

(30) Foreign Application Priority Data

May 6, 2023 (CN) .......................... 202321064987.4

(51) Int. Cl.
  *F21V 3/04* (2018.01)
  *F21S 8/02* (2006.01)
  *F21W 131/30* (2006.01)

(52) U.S. Cl.
  CPC .............. *F21V 3/049* (2013.01); *F21S 8/026* (2013.01); *F21W 2131/30* (2013.01)

(58) Field of Classification Search
  CPC ..... F21V 3/049; F21S 8/026; F21W 2131/30; G02B 6/0028; F21Y 2103/33; F21Y 2113/20; F21Y 2115/10
  See application file for complete search history.

(56) References Cited

U.S. PATENT DOCUMENTS

| | | | |
|---|---|---|---|
| 11,761,597 B1 * | 9/2023 | Zheng | F21S 8/026 362/235 |
| 2023/0400163 A1 * | 12/2023 | Kumar | G02B 6/0058 |

* cited by examiner

*Primary Examiner* — Anne M Hines
*Assistant Examiner* — Jose M Diaz
(74) *Attorney, Agent, or Firm* — Westbridge IP LLC

(57) ABSTRACT

Disclosed is a night downlight, including a plastic case, a first lamp bead, a second lamp bead and a light guide ring. One end of the plastic case is provided with a light outlet, and the bottom of the plastic case is provided with the first lamp bead and the second lamp bead, the first lamp bead is arranged at the center of the bottom of the plastic case, the light guide ring includes a light guide inner ring and a light guide surface ring, the light guide inner ring is sleeved in the plastic case, one end of the light guide inner ring abuts against the second lamp bead, and the light guide surface ring is connected with the light guide inner ring and protrudes from the light outlet. The light guide area of the night downlight is larger, which can meet the needs of night lighting.

10 Claims, 5 Drawing Sheets

NIGHT DOWNLIGHT

CROSS-REFERENCE TO RELATED APPLICATIONS

The present application claims priority to Chinese Patent Application No. 202321064987.4 filed on May 6, 2023, the contents of which are incorporated herein by reference in its entirety.

TECHNICAL FIELD

The application relates to the field of lighting equipment, in particular to a night downlight.

BACKGROUND

In the prior art, downlights with small night lights usually adopt the form of setting a light guide ring inside the plastic case, wherein night light lamp beads are arranged around the main lamp bead, and the light guide ring guides out the light emitted by the night light lamp bead. Taking Chinese utility model patent with the application number CN202021265094.2 as an example, it discloses a downlight, in which a first light-emitting part is arranged in the surface ring, and there is a light-emitting gap between the reflective cup and the face ring, where a light guide ring is installed, and by which the light emitted by the first light-emitting part is led out the downlight. However, the light emitting area of the light guide ring in this design is small, resulting in poor night light effect; at the same time, the gap between the light guide ring and the first light-emitting part is relatively large, so light leakage and other phenomena are prone to occur when the gap between the components is large.

SUMMARY

The technical problem to be solved by the present application is to provide a night downlight that can accurately guide light with a large light guide and output area, and can meet the requirement of night lighting.

In order to solve the above technical problems, the technical solution adopted by the present application is: a night downlight, including a plastic case, a first lamp bead, a second lamp bead and a light guide ring, one end of the plastic case is provided with a light outlet, a bottom of the plastic case is provided with a first lamp bead and a second lamp bead, the first lamp bead is arranged at the center of the bottom of the plastic case, and the second lamp bead is arranged around the first lamp bead; the light guide ring includes a light guide inner ring and a light guide surface ring, the light guide inner ring is sleeved in the plastic case, one end of the light guide inner ring is against the second lamp bead, and the light guide surface ring is connected with the light guide inner ring and protrudes from the light outlet.

Further, light-emitting patterns are provided on the light guide surface ring.

Further, a reflective cup is also included, which is locked with the bottom of the plastic case; the first lamp bead is arranged in an opening of the reflective cup near the bottom of the plastic case; the light guide inner ring is located between a peripheral surface of the reflective cup and the inner walls of the plastic case.

Further, the part where the light guide surface ring is connected with the light guide inner ring is provided with a first groove; the opening at one end of the reflective cup away from the bottom of the plastic case is provided with a protruding outer edge that is pressed against on the first groove.

Further, a diffuser cover is also included, a second groove is arranged in the reflective cup, the diffuser cover is arranged in the reflective cup, and the diffuser cover is engaged with the second groove.

Further, a third groove is provided on the side of the light guide surface ring close to the plastic case, and an edge of the light outlet of the plastic case is engaged with the third groove.

Further, the bottom of the plastic case is provided with a positioning column, and the end of the reflective cup near the bottom of the plastic case is provided with a first positioning hole corresponding to the positioning column.

Further, a light source board is also included, on which the first lamp bead and the second lamp bead are arranged; the light source board is provided with a second positioning hole corresponding to the positioning column.

Further, the light source board is provided with a plurality of engaging ports along its circumference; the bottom of the plastic case is provided with a spacing frame corresponding to the engaging port, and the spacing frame is engaged with the engaging port.

Further, the spacing frame is provided with a pressing block that abuts partially against the adjacent light source board.

The beneficial effect of the present application is: the first lamp bead is used as the main light source of the downlight for normal illumination; and the second lamp bead is used as the light source of the night light, which abuts directly against the inner ring of the light guide, so that the light emitted is accurately guided by the light guide inner ring to the light guide surface ring. Since the light guide surface ring protrudes from the light outlet, the light guide area is larger, which can meet the needs of night lighting.

DETAILED DESCRIPTION OF THE EMBODIMENTS

Figure 1:
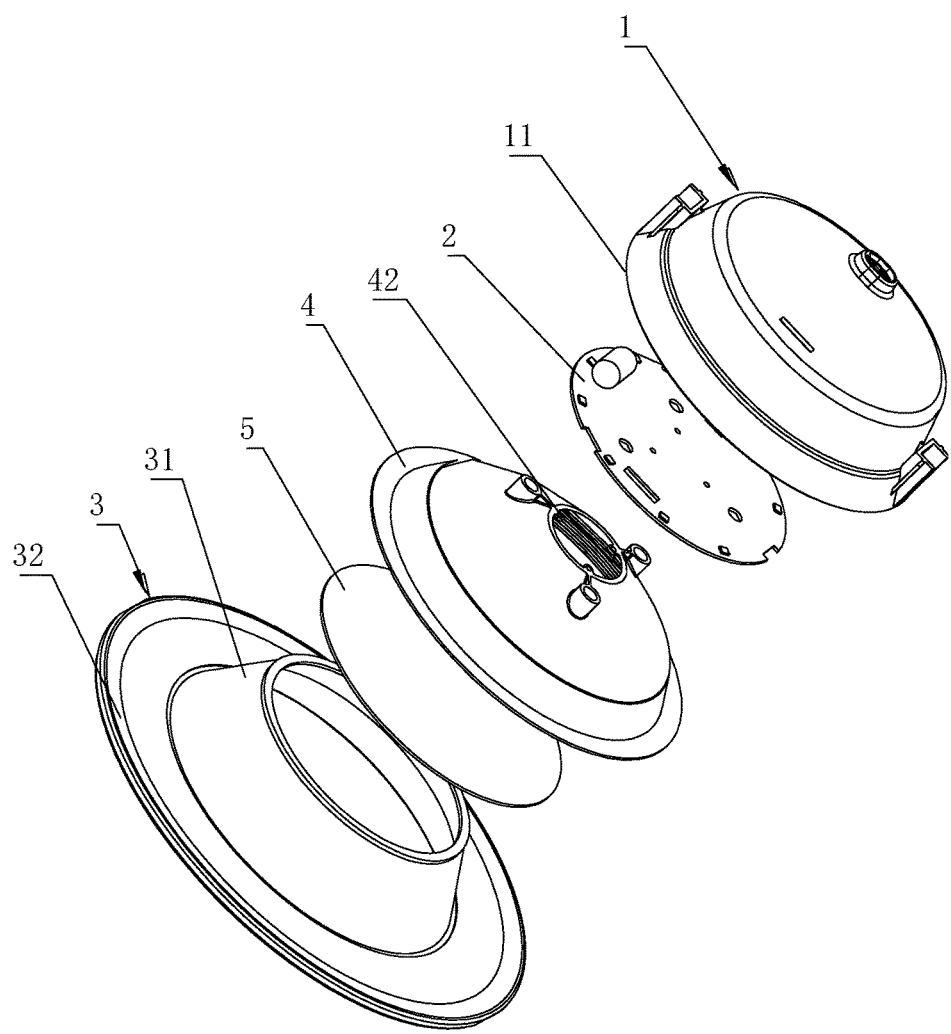
FIG. 1 is an exploded view of a night downlight according to a specific embodiment of the present application.

In order to describe the technology, implemented goals and effect of the present application in details, the following descriptions will be made in conjunction with the embodiments and accompanying drawings.

Please refer to FIGS. 1 to 6, a night downlight includes a plastic case 1, a first lamp bead 6, a second lamp bead 7 and a light guide ring 3, one end of the plastic case 1 is provided with a light outlet 11, the bottom of the plastic case 1 is provided with the first lamp bead 6 and the second lamp bead 7, the first lamp bead 6 is arranged at the center of the bottom of the plastic case 1, and the second lamp bead 7 is arranged around the first lamp bead 6; the light guide ring 3 includes a light guide inner ring 31 and light guide surface ring 32, the light guide inner ring 31 is sleeved in the plastic case 1, one end of the light guide inner ring 31 is against the second lamp bead 7, and the light guide surface ring 32 is in contact with the light guide inner ring 31 and protrudes from the light outlet 11.

It can be known from the above description that the beneficial effect of the present application is: the first lamp bead 6 is used as the main light source of the downlight for normal illumination; the second lamp bead 7 is used as the light source of the night light, which abuts directly against the light guide inner ring 31, so that the emitted light is accurately guided to the light guide surface ring 32 by the light guide inner ring 31. Since the light guide surface ring 32 protrudes from the light outlet 11, the light guide area is larger, which can meet the needs of night lighting.

Further, the light guide surface ring 32 is provided with light emitting patterns.

It can be known from the above description that a certain luminous effect can be implemented by providing the luminous patterns on the light guide surface ring 32.

Further, a reflective cup 4 is also included, which is locked to the bottom of the plastic case 1; the first lamp bead 6 is arranged in the opening of the reflective cup 4 close to the bottom of the plastic case 1; the light guide inner ring 31 is located between a peripheral surface of the reflective cup 4 and the inner wall of the plastic case 1.

From the above description, it can be seen that the light emitted from the middle of the downlight is implemented through the cooperation of the reflective cup 4 and the first lamp bead 6, and the light emitted by the first lamp bead 6 is reflected by the reflective cup 4 and emitted from the light outlet 11; the light guide inner ring 31 is reasonably arranged in the gap between the reflective cup 4 and the plastic case 1 to improve the utilization rate of the space in the plastic case 1.

Further, the part where the light guide surface ring 32 is connected with the light guide inner ring 31 is provided with a first groove 33; the opening at one end of the reflective cup 4 away from the bottom of the plastic case 1 is provided with a protruding outer edge that is pressed against the first groove 33.

It can be seen from the above description that the first groove 33 on the light guide surface ring 32 cooperates with the protruding outer edge of the reflective cup 4 to make the two fit; at the same time, by locking the reflective cup 4 and the plastic case 1 (through the cooperation at this place), the light guide ring 3 is integrally fixed in the plastic case 1 without additional fixing measures.

Further, a diffuser cover 5 is also included, a second groove 41 is arranged in the reflective cup 4, the diffuser cover 5 is arranged in the reflective cup 4, and is engaged with the second groove 41.

It can be seen from the above description that the design of the second groove 41 in the reflective cup 4 realizes fast clamping and fixing of the diffuser cover 5; the diffuser cover 5 can change the light emitting angle of the first lamp bead 6 to adjust the light emitting effect.

Further, the light guide surface ring 32 is provided with a third groove 34 on the side close to the plastic case 1, and the edge of the light outlet 11 of the plastic case 1 is engaged with the third groove 34.

It can be seen from the above description that through the engagement between the third groove 34 of the light guide surface ring 32 and the edge of the light outlet 11 of the plastic case 1, the installation of the light guide ring 3 is limited to ensure that the light guide inner ring 31 can accurately against the second lamp bead 7 to guide its light.

Further, the bottom of the plastic case 1 is provided with a positioning column 12 and the end of the reflective cup 4 near the bottom of the plastic case 1 is provided with a first positioning hole 42 corresponding to the positioning column 12.

From the above description, it can be seen that through the cooperation of the positioning column 12 at the bottom of the plastic case 1 and the first positioning hole 42 of the reflective cup, the accurate positioning of the reflective cup during installation can be realized.

Further, a light source board 2 is also included, on which the first and second lamp bead 7s are arranged; the light source board 2 is provided with a second positioning hole 22 corresponding to the positioning column 12.

It can be seen from the above description that the first lamp bead 6 and the second lamp bead 7 are installed on the light source board 2, and through the cooperation of the second positioning hole 22 on the light source board 2 and the positioning column 12 of the plastic case 1, the positioning of the light source board 2 and the reflective cup 4 is implemented, which ensures that the first lamp bead 6 can be accurately opposed to the opening at one end of the reflective cup 4.

Further, the light source board 2 is provided with a plurality of engaging ports 21 along its circumference; the bottom of the plastic case 1 is provided with a spacing frame 13 corresponding to the engaging port 21, and the spacing frame 13 is engaged with the engaging port 21.

It can be seen from the above description that the light source board 2 is engaged with the spacing frame 13 at the bottom of the plastic case 1 through its engaging port 21.

Further, the limiting frame 13 is provided with a pressing block 14 that partially abuts against the adjacent light source board 2.

It can be seen from the above description that the light source board 2 is prevented from falling off by the pressing block 14 on the spacing frame 13 abutting against the light source board 2.

Referring to FIGS. 1 to 6, embodiment 1 of the present application is as follows.

The application scene of the present application: in the existing downlight design with night lighting function, the light outlet area of the light guide ring 3 is small, resulting in poor effect of the night lighting; at the same time, the gap between the light guide ring 3 and the first light-emitting part is relatively large, so light leakage and other phenomena are prone to occur when the gap between components is large.

As shown in FIGS. 1 to 6, the night downlight of this embodiment includes a plastic case 1, a light source plate 2, a diffusion cover 5, a reflective cup 4, a first lamp bead 6, a second lamp bead 7 and a light guide ring 3.

Figure 2:
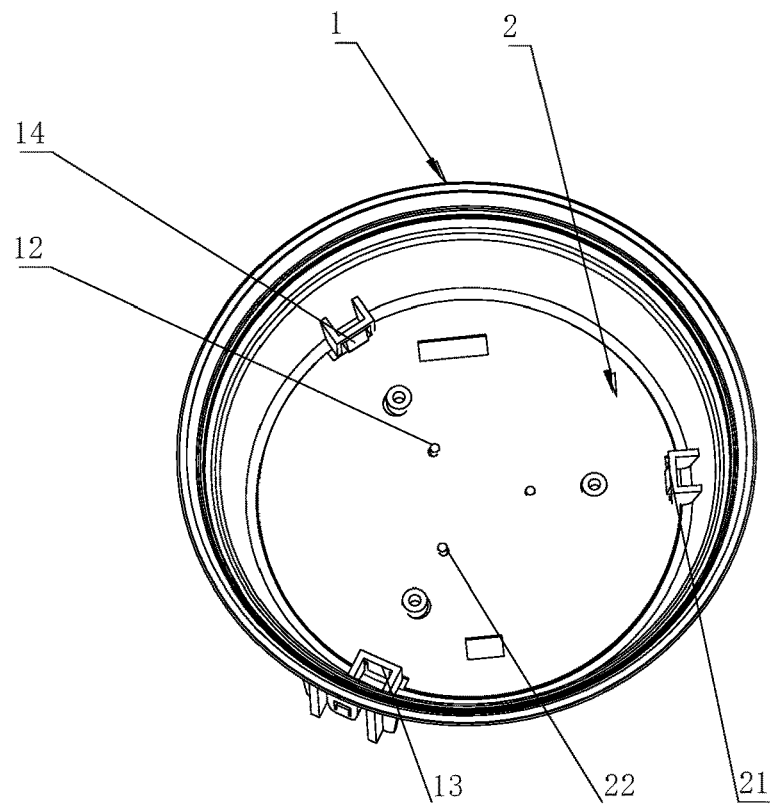
FIG. 2 is a schematic diagram of the structure of the night downlight when the plastic case cooperates with the light source board according to the specific embodiment of the present application.
Figure 4:
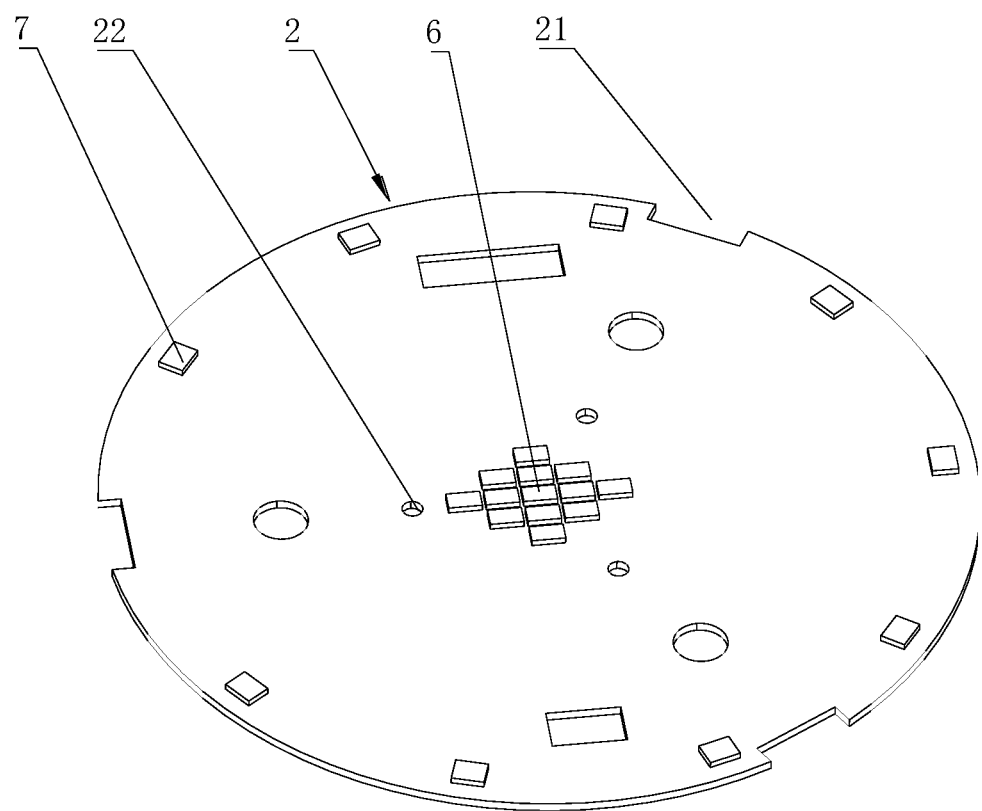
FIG. 4 is a schematic diagram of the structure of a light source board of a night downlight according to a specific embodiment of the present application.

As shown in FIGS. 1, 2 and 4, a light outlet 11 is provided at one end of the plastic case 1, and a light source board 2 is provided at the bottom of the plastic case 1. Specifically, the light source board 2 is provided with a plurality of engaging ports 21 along its circumference; the bottom of the plastic case 1 is provided with a spacing frame 13 corresponding to the engaging port 21, and the spacing frame 13 is engaged with the engaging port 21; a pressing block 14 is arranged on the limiting frame 13, and partially abuts against the adjacent light source board 2. Meanwhile, the bottom of the plastic case 1 is provided with a positioning column 12, and the light source board 2 is provided with a second positioning hole 22 corresponding to the positioning column 12.

Figure 5:
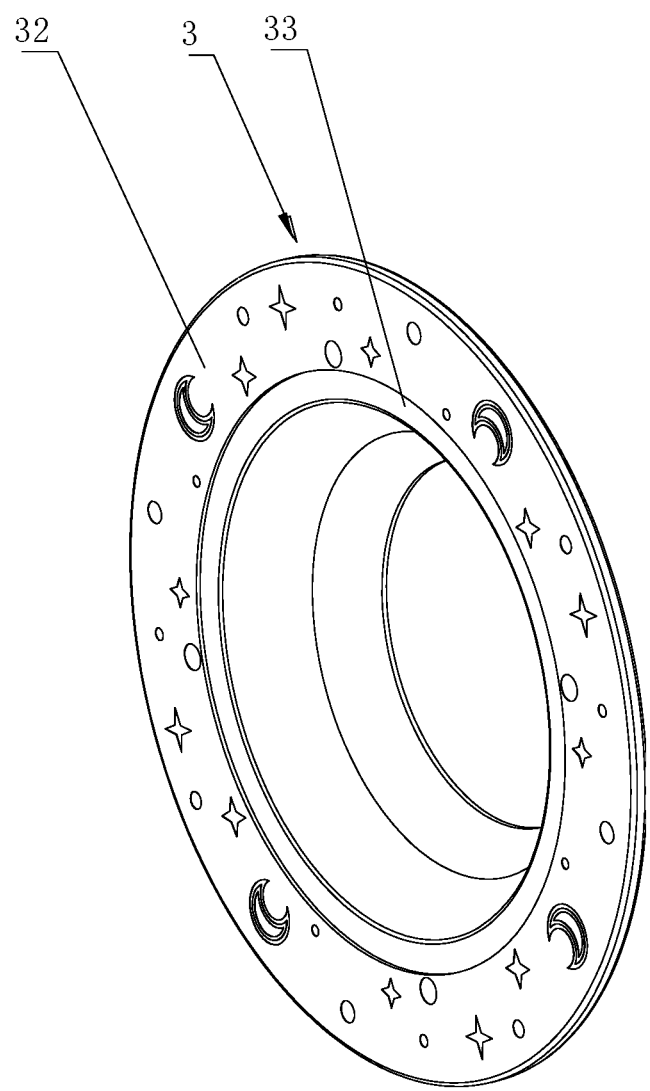
FIG. 5 is a schematic diagram of the structure of the light guide ring of the night downlight according to the specific embodiment of the present application.
Figure 6:
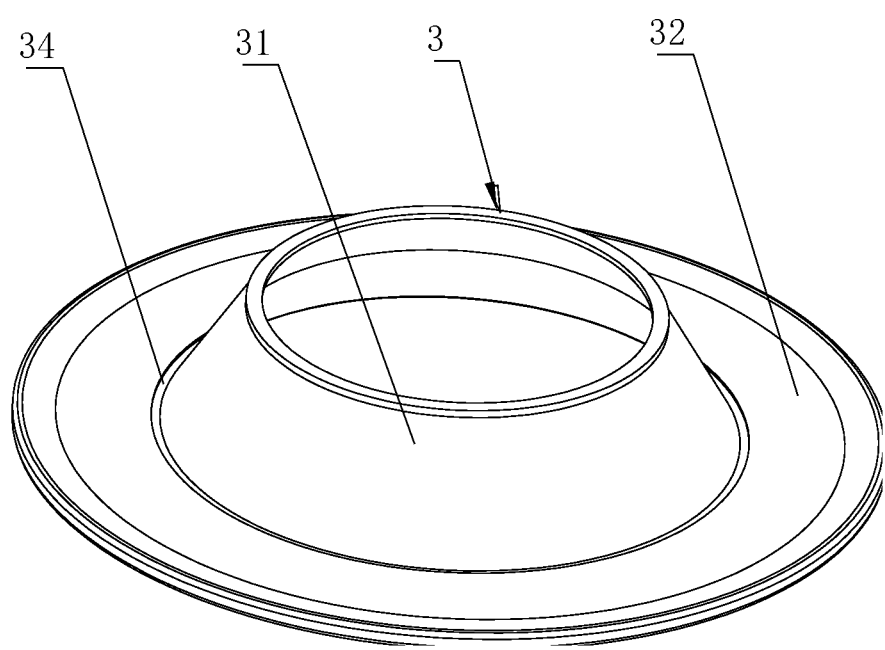
FIG. 6 is a schematic diagram of the structure of the light guide ring of the night downlight from another perspective according to the specific embodiment of the present application.

As shown in FIGS. 1, 5 and 6, the light source board 2 is provided with a first lamp bead 6 and a second lamp bead 7. The first lamp bead 6 is arranged in the center of the light source board 2, and the second lamp bead 7 is arranged around the first lamp bead 6; the light guide ring 3 includes a light guide inner ring 31 and a light guide surface ring 32, and the light guide inner ring 31 is sleeved in the plastic case 1, one end of the light guide inner ring 31 abuts against the second lamp bead 7, and the light guide surface ring 32 is connected with the light guide inner ring 31 and protrudes from the light outlet 11. The light guide surface ring 32 is provided with light-emitting patterns.

Figure 3:
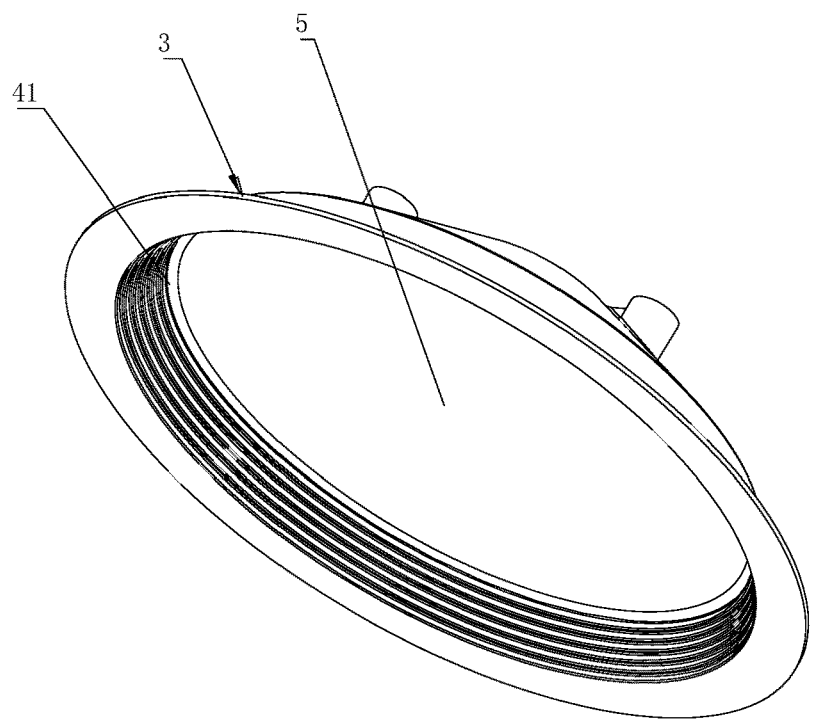
FIG. 3 is a schematic diagram of the structure of the night downlight when the diffusion cover cooperates with the reflective cup according to the specific embodiment of the present application.

As shown in FIGS. 1 and 3, the reflective cup 4 is locked to the bottom of the plastic case 1; the end of the reflective cup 4 near the bottom of the plastic case 1 is provided with a first positioning hole 42 corresponding to the positioning column 12. The first lamp bead 6 is arranged in the opening of the reflective cup 4 near the bottom of the plastic case 1; the light guide inner ring 31 is located between a peripheral surface of the reflective cup 4 and the inner wall of the plastic case 1.

As shown in FIG. 5, the part where the light guide surface ring 32 is connected to the light guide inner ring 31 is provided with a first groove 33; the end of the reflective cup 4 away from the bottom of the plastic case 1 is provided with a protruding outer edge that is pressed against the first groove 33.

As shown in FIG. 3, a second groove 41 is provided in the reflective cup 4, the diffusion cover 5 is arranged in the reflective cup 4, and the diffusion cover 5 is engaged with the second groove 41.

As shown in FIG. 6, the light guide surface ring 32 is provided with a third groove 34 on the side close to the plastic case 1, and the edge of the light outlet 11 of the plastic case 1 is engaged with the third groove 34.

The working principle of the present application: when used as a normal light source, the first lamp bead 6 emits light, which is emitted through the light outlet 11 of the plastic case 1 through the reflective cup 4 and the diffusion cover 5; when used as a night light, the second lamp bead 7 emits light, which abuts against the light guide inner ring 31 of the light guide ring 3, so that its light is accurately guided to the light guide surface ring 32 which protrudes from the opening of the plastic case 1 as a whole, has a larger light guide area, and can well meet the needs of night lighting.

To sum up, the present application provides a night downlight, the first lamp bead 6 is used as the main light source of the downlight for normal illumination; the second lamp bead 7 is used as the light source of the night light, which abuts directly against the light guide inner ring, so that the light emitted is accurately guided by the light guide inner ring to the light guide surface ring. Since the light guide surface ring protrudes from the light outlet, the light guide area is larger, which can meet the needs of night lighting.

The above description is only an embodiment of the present application, and does not limit the patent scope of the present application. All equivalent transformations made by using the contents of the description of the present application and the accompanying drawings, or directly or indirectly used in related technical fields, should all be included in the scope of patent protection of the present application.

The invention claimed is:

1. A night downlight, comprising a plastic case, a first lamp bead, a second lamp bead and a light guide ring, wherein one end of the plastic case is provided with a light outlet, and a bottom of the plastic case is provided with the first lamp bead and the second lamp bead, the first lamp bead is arranged at a center of the bottom of the plastic case, the second lamp bead is arranged around the first lamp bead; the light guide ring includes a light guide inner ring and a light guide surface ring, the light guide inner ring is sleeved in the plastic case, one end of the light guide inner ring abuts with the second lamp bead, and the light guide surface ring is connected with the light guide inner ring and protrudes from the light outlet.

2. The night downlight according to claim 1, wherein the light-guiding surface ring is provided with light-emitting patterns.

3. The night downlight according to claim 1, further comprising a reflective cup that is locked to the bottom of the plastic case; wherein the first lamp bead is arranged in an opening of the reflective cup close to the bottom of the plastic case; the light guide inner ring is located between a peripheral surface of the reflective cup and the inner wall of the plastic case.

4. The night downlight according to claim 3, wherein the part where the light guide surface ring is connected with the light guide inner ring is provided with a first groove; the opening at one end of the reflective cup away from the bottom of the plastic case is provided with a protruding outer edge that is pressed against on the first groove.

5. The night downlight according to claim 3, further comprising a diffuser cover, wherein a second groove is arranged in the reflective cup, the diffuser cover is arranged in the reflective cup, and the diffuser cover is engaged with the second groove.

6. The night downlight according to claim 1, wherein a third groove is provided on the side of the light guide surface ring close to the plastic case, and an edge of the light outlet of the plastic case is engaged the third groove.

7. The night downlight according to claim 3, wherein the bottom of the plastic case is provided with a positioning column, and the end of the reflector close to the bottom of the plastic case is provided with a first positioning hole corresponding to the positioning column.

8. The night downlight according to claim 7, further comprising a light source board, wherein the first lamp bead and the second lamp bead are arranged on the light source board; the light source board is provided with a second positioning hole corresponding to the positioning column.

9. The night downlight according to claim 8, wherein the light source board is provided with a plurality of engaging ports along a circumference of the light source board; the bottom of the plastic case is provided with a spacing frame corresponding to the engaging port, and the spacing frame is engaged with the engaging port.

10. The night downlight according to claim 9, wherein a pressing block is provided on the spacing frame, and the pressing block partially abuts against the adjacent light source board.

\* \* \* \* \*